(12) United States Patent
Ootomo

(10) Patent No.: US 12,182,411 B2
(45) Date of Patent: Dec. 31, 2024

(54) SIGNAL PROCESSING IN BRIDGE CHIP IN SEMICONDUCTOR STORAGE DEVICE AND MEMORY SYSTEM

(71) Applicant: Kioxia Corporation, Tokyo (JP)

(72) Inventor: Goichi Ootomo, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 5 days.

(21) Appl. No.: 18/176,364

(22) Filed: Feb. 28, 2023

(65) Prior Publication Data

US 2023/0409202 A1 Dec. 21, 2023

(30) Foreign Application Priority Data

Jun. 21, 2022 (JP) .................................. 2022-099759

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)
(58) Field of Classification Search
CPC ..... G06F 3/0619; G06F 3/0679; G06F 3/0659
See application file for complete search history.

(56) References Cited

U.S. PATENT DOCUMENTS

| 8,751,692 B2 | 6/2014 | Fukada |
| 9,977,731 B2* | 5/2018 | Pyeon ................. G06F 12/0238 |
| 2015/0254009 A1* | 9/2015 | Eguchi ................. G06F 3/0661 |
| | | 711/147 |

FOREIGN PATENT DOCUMENTS

| JP | 2008-158938 A | 7/2008 |
| JP | 2013-089190 A | 5/2013 |
| JP | 2021-064378 A | 4/2021 |

* cited by examiner

*Primary Examiner* — Mark A Giardino, Jr.
(74) *Attorney, Agent, or Firm* — Kim & Stewart LLP

(57) ABSTRACT

A semiconductor storage device includes a plurality of semiconductor memory chips and a bridge chip. The bridge chip includes a first interface connectable to an external memory controller that is external to the semiconductor storage device, a plurality of second interfaces connected to the semiconductor memory chips, and a controller. The controller is configured to, upon receiving, by the first interface, a first command sequence that includes a data transfer command to perform data transfer with one of the semiconductor chips and size information indicating a size of data to be transferred, start an operation to perform the data transfer, and end the operation, upon an amount of data that has been received by the first interface during the data transfer reaching the size indicated by the size information.

20 Claims, 7 Drawing Sheets

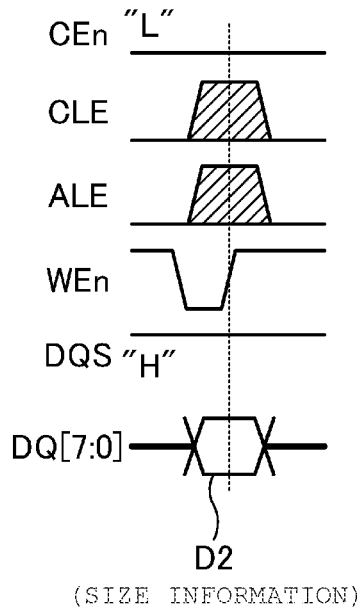
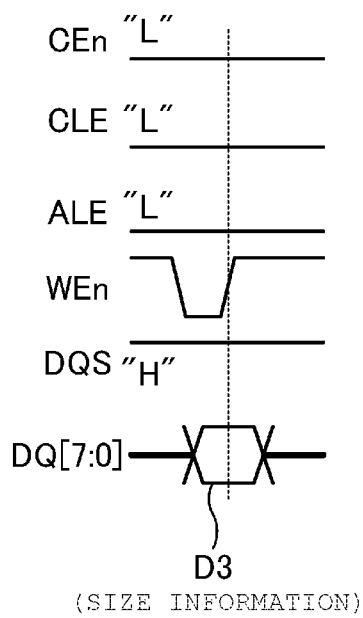

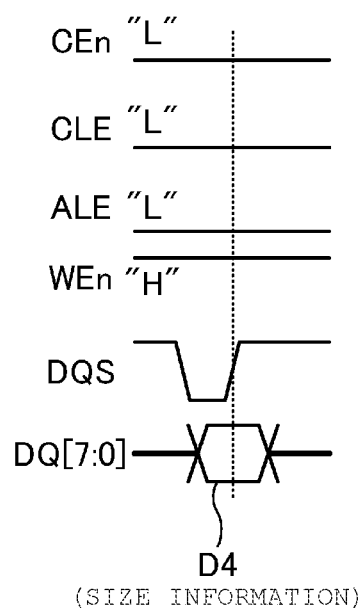

SIGNAL PROCESSING IN BRIDGE CHIP IN SEMICONDUCTOR STORAGE DEVICE AND MEMORY SYSTEM

CROSS-REFERENCE TO RELATED APPLICATION(S)

This application is based upon and claims the benefit of priority from Japanese Patent Application No. 2022-099759, filed Jun. 21, 2022, the entire contents of which are incorporated herein by reference.

FIELD

Embodiments described herein relate generally to a semiconductor storage device and a memory system.

BACKGROUND

There is a semiconductor storage device in which a semiconductor integrated circuit (may be referred to as a bridge chip) is provided between a group of external terminals connected to an external controller (hereinafter, referred to as a memory controller) and a plurality of memory chips. In this semiconductor storage device, data transfer between a memory controller and a plurality of memory chips is performed via the bridge chip.

BRIEF DESCRIPTION OF THE DRAWINGS

FIG. 6 is a diagram illustrating an example of a method for transferring size information according to the embodiment.

FIG. 7 is a diagram illustrating another example of the method for transferring size information according to the embodiment.

FIG. 8 is a diagram illustrating still another example of the method for transferring size information according to the embodiment.

DETAILED DESCRIPTION

Embodiments provide a semiconductor storage device and a memory system with high efficiency of data transfer.

In general, according to an embodiment, a semiconductor storage device includes a plurality of semiconductor memory chips and a bridge chip. The bridge chip includes a first interface connectable to an external memory controller that is external to the semiconductor storage device, a plurality of second interfaces connected to the semiconductor memory chips, and a controller. The controller is configured to, upon receiving, by the first interface, a first command sequence that includes a data transfer command to perform data transfer with one of the semiconductor chips and size information indicating a size of data to be transferred, start an operation to perform the data transfer, and end the operation, upon an amount of data that has been received by the first interface during the data transfer reaching the size indicated by the size information.

A semiconductor storage device and a memory system according to embodiments will be described in detail below with reference to the accompanying drawings. It is noted that the present disclosure is not limited by these embodiments.

Embodiments

Figure 1:
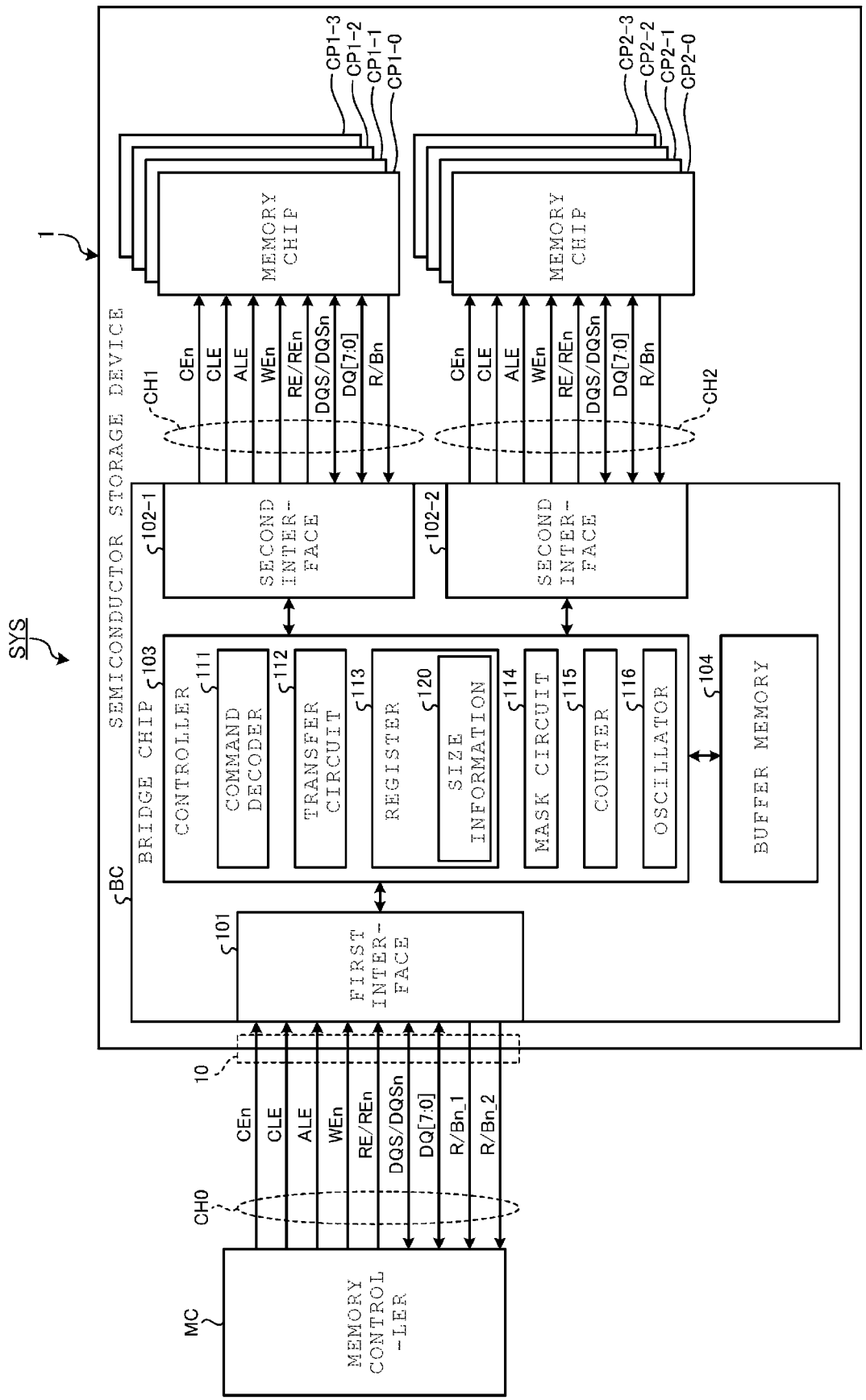
FIG. 1 is a schematic diagram illustrating an example of a configuration of a memory system to which a semiconductor storage device according to an embodiment is applied.

FIG. 1 is a schematic diagram illustrating an example of a configuration of a memory system SYS to which a semiconductor storage device 1 according to an embodiment is applied.

The memory system SYS includes a memory controller MC and a semiconductor storage device 1. The semiconductor storage device 1 includes an external terminal group 10, a bridge chip BC, and a plurality of memory chips CP1-0 to CP1-3 and CP2-0 to CP2-3.

It is noted that the memory controller MC is an example of a first device. Each of the memory chips CP1-0 to CP1-3 and CP2-0 to CP2-3 is an example of the first chip. The bridge chip BC is an example of a second chip.

The semiconductor storage device 1 can be mounted as a Multi Chip Package (MCP) in which the memory chips CP1-0 to CP1-3 and the memory chips CP2-0 to CP2-3 are stacked. When the semiconductor storage device 1 is mounted as an MCP, in the semiconductor storage device 1, the periphery of the bridge chip BC and the plurality of memory chips CP1-0 to CP1-3 and CP2-0 to CP2-3 may be sealed with a mold resin.

A configuration in which the four memory chips CP1-0 to CP1-3 are connected to the bridge chip BC via a channel CH1 and the four memory chips CP2-0 to CP2-3 are connected to the bridge chip BC via a channel CH2 is illustrated in FIG. 1. That is, the semiconductor storage device 1 may be a multi-memory chip module including the plurality of (herein, eight) memory chips CP1-0 to CP1-3 and CP2-0 to CP2-3.

Each of the memory chips CP1-0 to CP1-3 and CP2-0 to CP2-3 is, for example, a non-volatile memory chip such as a NAND flash memory. It is noted that the number of memory chips CP provided in the semiconductor storage device 1 is not limited to eight. In addition, the number of channels connecting the bridge chip BC and the plurality of memory chips CP are not limited to two.

The semiconductor storage device 1 can be connected to the memory controller MC via a wired communication path. This wired communication path is denoted by a channel CH0. The channel CH0 is configured according to a predetermined standard. When the memory chips CP1-0 to CP1-3 and CP2-0 to CP2-3 are NAND flash memory chips, the predetermined standard is, for example, a toggle DDR standard.

The bridge chip BC is electrically connected to the plurality of (herein, two) channels CH1 and CH2. The memory chips CP1-0 to CP1-3 are connected to the bridge chip BC via the channel CH1, and the memory chips CP2-0 to CP2-3 are connected to the bridge chip BC via the channel CH2. The memory chips CP1-0 to CP1-3 are connected to the channel CH1 configured according to a predetermined standard. The memory chips CP2-0 to CP2-3 are connected to the channel CH2 configured according to a predetermined standard. When each memory chip CP is a NAND flash memory, the predetermined standard is, for example, the toggle DDR standard. Hereinafter, it is assumed that each memory chip CP is the NAND type flash memory and the predetermined standard is the toggle DDR standard.

The channel CH0 includes a signal line for transferring a chip enable signal CEn, a signal line for transferring a command latch enable signal CLE, a signal line for transferring an address latch enable signal ALE, a signal line for transferring a write enable signal WEn, a signal line for transferring a read enable signal RE/REn a signal line for transferring a data strobe signal DQS/DQSn, a signal line for transferring a data signal DQ[7:0] having a predetermined bit width (herein, 8-bit width as an example), a signal line for transferring a ready/busy signal R/Bn_1, and a signal line for transferring a ready/busy signal R/Bn_2. It is noted that "n" written at the end of the symbol representing the signal indicates that the signal is operated by negative logic. Whether each signal is processed with negative logic or positive logic may be freely designed.

The chip enable signal CEn is a signal for enabling the memory chip CP that is a target of accessing. The data strobe signal DQS/DQSn is a signal instructing a counter-party device to take in the data transmitted with the data signal DQ[7:0]. The data strobe signal DQS/DQSn is a differential signal configured with a data strobe signal DQS and a data strobe signal DQSn. The command latch enable signal CLE is a signal indicating that data signal DQ[7:0] is a command. The address latch enable signal ALE is a signal indicating that the data signal DQ[7:0] is an address. The write enable signal WEn is a signal instructing the counter-party device to take in the command or the address transmitted with the data signal DQ[7:0]. The read enable signal RE/REn is a signal instructing the counter-party device to output the data signal DQ[7:0]. The read enable signal RE/REn is a differential signal configured with a read enable signal RE and a read enable signal REn. The ready/busy signal R/Bn_1 and the ready/busy signal R/Bn_2 are signals indicating a ready state in which a command is awaited or a busy state in which a command cannot be executed even when the command is received. It is noted that the configuration of the signal line for transferring the ready/busy signal R/Bn provided in the channel CH0 is not limited to the above-described example. For example, with respect to the ready/busy signal R/Bn, the channel CH0 may be provided with one signal line for transferring one ready/busy signal R/Bn generated by wired OR connection or the like from the ready/busy signal R/Bn applied to the channel CH1 and the ready/busy signal R/Bn applied to the channel CH1.

Each of the channels CH1 and CH2 can transmit and receive a group of signals of the same kind as those of the channel CH0. That is, each of the channels CH1 and CH2 is provided with a signal line for transferring the chip enable signal CEn, a signal line for transferring the command latch enable signal CLE, a signal line for transferring the address latch enable signal ALE, a signal line for transferring the write enable signal WEn, a signal line for transferring the read enable signals RE/REn, a signal line for transferring the data strobe signal DQS/DQSn, a signal line for transferring the data signal DQ[7:0], and a signal line for transferring the ready/busy signal R/Bn.

The bridge chip BC includes a first interface 101, two second interfaces 102, a controller 103, and a buffer memory 104.

The first interface 101 is a PHY circuit that transmits and receives electrical signals to and from the memory controller MC via the channel CH0.

A second interface 102-1 of the two second interfaces 102 is a PHY circuit that transmits and receives electrical signals to and from the four memory chips CP1-0 to CP1-3 via the channel CH1. A second interface 102-2 of the two second interfaces 102 is a PHY circuit that transmits and receives electrical signals to and from the four memory chips CP2-0 to CP2-3 via the channel CH2.

The buffer memory 104 is a memory that temporarily stores the transferred data between the memory controller MC and the memory chip CP. The buffer memory 104 may be configured with a Dynamic Random Access Memory (DRAM) or may be configured with a Static Random Access Memory (SRAM). It is noted that the type of the memory configuring the buffer memory 104 is not limited thereto.

The controller 103 is located between the first interface 101 and the two second interfaces 102. The controller 103 controls receiving and transferring of information between the first interface 101 and the two second interfaces 102 by using the buffer memory 104.

The controller 103 includes a command decoder 111, a transfer circuit 112, a register 113, a mask circuit 114, a counter 115, and an oscillator 116.

The command decoder 111 analyzes a command received from the memory controller MC via the channel CH0. The command decoder 111 can issue a command to the memory chip CP in accordance with the analysis result.

When performing data transfer to and from the semiconductor storage device 1, the memory controller MC issues a command sequence containing a command instructing the data transfer and address information to the bridge chip BC. In the present embodiment, the memory controller MC can add the size information corresponding to the size of the data scheduled for transfer to the command sequence for such data transfer. When the command sequence for the data transfer contains the size information, the command decoder 111 stores the size information in the register 113.

The register 113 is a memory that stores various information for controlling the operation of the bridge chip BC. In particular, in the present embodiment, the register 113 is used as a memory to store the size information. The size information received from the memory controller MC is stored as the size information 120 in the register 113.

The transfer circuit 112 includes pipelines that transfer signals between the first interface 101 and the two second interfaces 102.

The mask circuit 114 masks the size information when the command sequence containing the size information is transferred. Accordingly, the size information is not transferred to the memory chip CP.

The counter 115 is used to measure the amount (or size) of data transferred during the data transfer in accordance with the command sequence for the data transfer. The controller 103 determines the timing of end of the data transfer based on the size information 120 stored in the register 113 and the value of the counter 115.

The data transfer includes a data-in operation, which is an operation of inputting data to the memory chip CP, and a data-out operation, which is an operation of acquiring data from the memory chip CP.

In the data-in operation, the bridge chip BC receives data of the transfer target from the memory controller MC as the data signal DQ[7:0], and the data strobe signal DQS/DQSn supplied from the memory controller MC is toggled. The transfer circuit 112 uses the data strobe signal DQS/DQSn as the drive signal for passing the data through the pipeline during the time when the data strobe signal DQS/DQSn is toggled.

The data strobe signal DQS/DQSn supplied to the bridge chip BC is toggled only the number of times corresponding to the size of the transfer data. Meanwhile, the pipeline provided in transfer circuit 112 has one or more flip-flops. In order to allow all the data received from the memory controller MC to pass through the transfer circuit 112, the number of times of toggling of the driving signal obtained by adding the number of times in accordance with at least the number of flip-flops provided in the transfer circuit 112 to the number of times in accordance with the size of the received data is required. In other words, the number of times of toggling of the data strobe signal DQS/DQSn supplied from the memory controller MC is insufficient to pass all the data of the transfer target through the transfer circuit 112. When the toggling of the data strobe signal DQS/DQSn supplied from the memory controller MC ends, a portion of the data of the transfer target received from the memory controller MC remains in the pipeline without being transferred to the memory chip CP.

The controller 103 counts the amount (or size) of the data of the transfer target received from the memory controller MC by using the counter 115 and determines the end of the reception of the data from the memory controller MC based on the value of the counter 115 and the size information 120. When the reception of the data from the memory controller MC ends, the controller 103 allows the transfer circuit 112 to use the clock signal generated by the oscillator 116 as a drive signal, so that all the data remaining in the pipeline is transferred to the memory chip CP. The process of transferring all the data remaining in the transfer circuit 112 to the memory chip CP by using the clock signal oscillated by the oscillator 116 is referred to as a post-process.

In the data-out operation, the bridge chip BC is supplied with the command sequence for the data-out operation from the memory controller MC. After the command sequence for the data-out operation, the bridge chip BC toggles the read enable signals RE/REn supplied from the memory controller MC only the number of times in accordance with the size of the data of the transfer target.

In the bridge chip BC, the controller 103 autonomously starts toggling of the read enable signals RE/REn to the memory chip CP before starting toggling of the read enable signals RE/REn from the memory controller MC. The memory chip CP starts outputting the data in accordance with the start of toggling the read enable signals RE/REn supplied from the bridge chip BC and starts toggling the data strobe signal DQS/DQSn to the bridge chip BC. The memory chip CP generates the data strobe signal DQS/DQSn, for example, based on the read enable signals RE/REn supplied from the bridge chip BC. In the bridge chip BC, the controller 103 takes in the data received from the memory chip CP based on the data strobe signal DQS/DQSn and stores the taken-in data in the buffer memory 104 sequentially. Then, the controller 103 outputs the data sequentially stored in the buffer memory 104 to the memory controller MC in accordance with the read enable signals RE/REn supplied from the memory controller MC.

The bridge chip BC needs to toggle the read enable signals RE/REn to the memory chip CP at least the number of times corresponding to the size of the data desired by the memory controller MC. When the read enable signals RE/REn is toggled more times than the number of times corresponding to the size of the data desired by the memory controller MC, more data than the data desired by the memory controller MC are allowed to be output from the memory chip CP, so that the time spent on the data-out operation becomes longer.

The controller 103 counts the number of times of toggling the read enable signals RE/REn supplied to the memory chip CP by using the counter 115. When the value of the counter 115 reaches the value corresponding to the size information 120, the controller 103 ends toggling the read enable signals RE/REn supplied to the memory chip CP. Accordingly, only the data desired by the memory controller MC can be output to the memory chip CP.

In this way, the controller 103 ends the controlling of the data transfer at a timing corresponding to the size information. In the data-in operation, the controlling of the data transfer here is a post-process. In the case of the data-out operation, the controlling of the data transfer referred to here is toggling of the read enable signals RE/REn supplied to the memory chip CP.

A technique compared with the above embodiment will be described. The technique compared with the above embodiment is referred to as Comparative Example. According to Comparative Example, the command sequence for the data transfer does not contain the size information.

According to Comparative Example, in the data-in operation, the bridge chip receives the data of the transfer target after receiving the command sequence for the data-in operation from the memory controller. At this time, the bridge chip determines whether the reception of the data of the transfer target has been completed based on a change in the signal (for example, the chip enable signal CEn or the command latch enable signal CLE) operated by the memory controller after the reception of the data is completed.

In contrast, according to the above embodiment, the command sequence for the data-in operation issued by the memory controller MC may contain the size information. When the command sequence for the data-in operation contains the size information, the bridge chip BC determines completion of the reception of the data based on the size information. Therefore, the post-process can be started without waiting for a change in the signal operated by the memory controller MC after the reception of the data is completed. That is, the total time required for the data-in operation is shortened, and thus, the efficiency of the data-in operation is improved.

In addition, according to Comparative Example, in the data-out operation, the bridge chip does not know the size of the data of the transfer target. For this reason, the bridge chip toggles the read enable signals RE/REn to the memory chip up to a maximum number of times (for example, the number of times corresponding to the page size) defined by the specifications of the memory chip. For this reason, the bridge chip acquires more data from the memory chip than the data desired by the memory controller, so that the total time spent in the data-out operation becomes longer.

In contrast, according to the above embodiment, the command sequence for the data-out operation issued by the memory controller MC may contain the size information. When the size information is contained in the command sequence for the data-out operation, the bridge chip BC determines the timing of end of toggling of the read enable signal RE/REn based on the size information. Therefore, the bridge chip BC can acquire only the data desired by the memory controller MC from the memory chip CP and can reduce the total time spent for the data-out operation.

That is, according to the above embodiment, the efficiency of the data transfer is improved.

In addition, according to the above embodiment, the size information is transferred during a latency period defined by the toggle DDR standard. Specifically, the memory chip CP prepares for the data transfer with respect to the command sequence for the data transfer. Then, after the preparation is completed, the data transfer can be performed. For this reason, in the toggle DDR standard, waiting (postponing) is defined for a predetermined time (referred to as a specified latency period) or more for preparation between the timing of the end of the transfer of the command sequence and the timing of the start of the data transfer. The size information is transferred during the specified latency period. Therefore, it is not necessary to add time to transfer the size information, and the transfer of the size information does not deteriorate the efficiency of the data transfer. Details of the specified latency period and the like will be described later.

Figure 2:
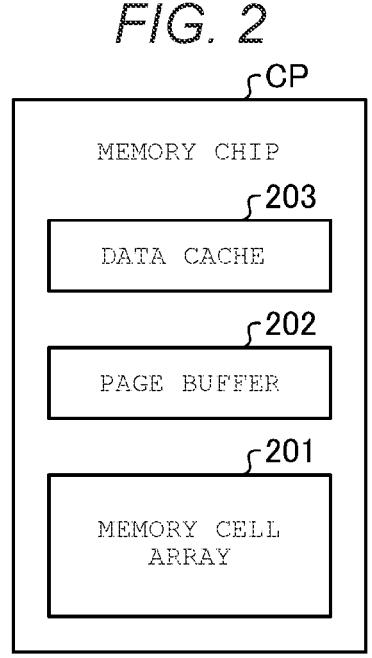
FIG. 2 is a schematic diagram illustrating an example of a configuration of a memory chip according to the embodiment.

FIG. 2 is a schematic diagram illustrating an example of the configuration of the memory chip CP according to the embodiment.

The memory chip CP has a memory cell array 201, a page buffer 202, and a data cache 203. Each of the page buffer 202 and the data cache 203 is configured with, for example, a Static Random Access Memory (SRAM). The page buffer 202 and the data cache 203 may be configured with flip-flops.

Access to the memory cell array 201 includes write (also referred to as program), read, and erase.

A series of operations in which the memory chip CP receives input data from the outside and the memory chip CP writes the input data to the memory cell array 201 is referred to as a write operation in the present disclosure. The data input to the memory chip CP from the outside is also referred to as write data. A series of operations in which the memory chip CP reads data from the memory cell array 201 and outputs the data to the outside is referred to as a read operation. The data output from the memory chip CP to the outside is also referred to as read data.

In the write operation, the memory chip CP receives the write data input from the outside in the data cache 203. The operation of inputting the write data to the data cache 203 corresponds to the data-in operation described above. After the data-in operation, the memory chip CP transfers the write data received in the data cache 203 to the page buffer 202. Then, after the transfer is completed, the memory chip CP writes the write data from the page buffer 202 to the memory cell array 201. The operation of writing data from the page buffer 202 to the memory cell array 201 is also referred to as a program operation.

In the read operation, first, the memory chip CP transfers the read data from the memory cell array 201 to the page buffer 202. The operation of transferring the read data from the memory cell array 201 to the page buffer 202 is also referred to as a sense operation. The memory chip CP transfers the read data stored in the page buffer 202 by the sense operation from the page buffer 202 to the data cache 203. Then, the memory chip CP outputs the read data from the data cache 203 to the outside. The operation of outputting the read data from the data cache 203 to the outside corresponds to the aforementioned data-out operation.

The memory cell array 201 includes a plurality of blocks. The data written to one block is erased all at once. Each block includes the plurality of pages. The page is a storage area that is a unit of writing of data by the program operation to the memory cell array 201 and that is a unit of reading of data by the sense operation. The data cache 203 and the page buffer 202 have a storage capacity of at least one page so that the program operation and the sense operation can be performed on the memory cell array 201 in units of a page. That is, the maximum amount of the data that can be transferred by one command sequence is the amount of one page (that is, a page size) in this case.

Next, signals transferred during the transfer of various data according to the embodiment will be described.

Figure 3:
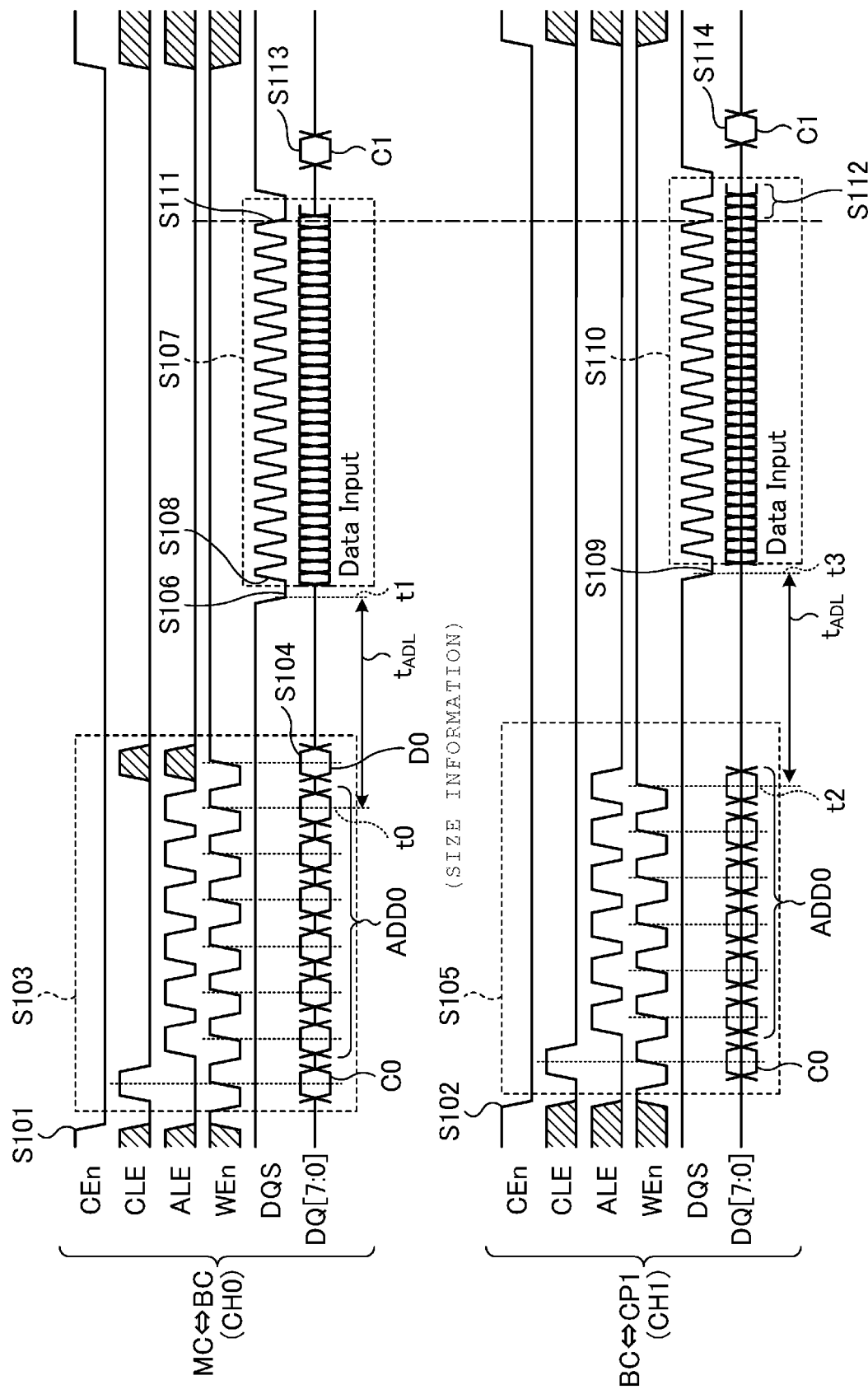
FIG. 3 is a timing chart illustrating an example of waveforms of signals transferred during the data-in operation in the memory system according to the embodiment.

FIG. 3 is a timing chart illustrating an example of waveforms of signals transferred during the data-in operation in the memory system SYS according to the present embodiment. Herein, as an example, a case where a certain memory chip CP1 connected to the channel CH1 is set as a target of the data-in operation will be described. In FIG. 3, waveforms of the chip enable signal CEn, the command latch enable signal CLE, the address latch enable signal ALE, the write enable signal WEn, the data strobe signal DQS among the data strobe signal DQS/DQSn, and the data signal DQ[7:0] in the channel CH0 and the channel CH1 are shown, and the waveforms of other signals are omitted.

First, the memory controller MC transitions the chip enable signal CEn of the channel CH0 to the active state (L level) (S101). Accordingly, the chip enable signal CEn of the channel CH1 also transitions to the active state (L level) (S102).

After that, the memory controller MC transfers the command sequence for the data-in operation including the size information to the bridge chip BC (S103). Specifically, the memory controller MC transfers a command C0 instructing the data-in operation, an address value ADD0 representing the position of the access destination, and data D0 as the size information in this order as the data signal DQ[7:0]. During the transferring of the command C0, the memory controller MC maintains the command latch enable signal CLE in an active state (H level) and toggles the write enable signal WEn. During the transferring of the address value ADD0, the memory controller MC maintains the address latch enable signal ALE in an active state (H level) and toggles the write enable signal WEn. During the transferring of the data D0, the memory controller MC toggles the write enable signal WEn. It is noted that, during the transferring of the data D0, the states of the command latch enable signal CLE and the address latch enable signal ALE are so-called "Don't care" states, which are freely set. In the example illustrated in FIG. 3, the address value ADD0 is transferred as a 6-byte data signal DQ[7:0]. It is noted that the information amount of the address value ADD0 is not limited to 6 bytes.

In the bridge chip BC, when the size information is received from the memory controller MC, the controller 103 stores the received size information in the register 113 (S104).

In the bridge chip BC, the controller 103 allows the transfer circuit 112 to transfer the command sequence for the data-in operation received from the memory controller MC to the memory chip CP1 (S105). It is noted that the mask circuit 114 masks the size information contained in the command sequence received from the memory controller MC. Therefore, the command sequence containing no size information is transferred from the bridge chip BC to the memory chip CP1.

In the toggle DDR standard, during the data-in operation, the time of a specified latency period $t_{ADL}$ or more from the completion of the input of the address value to the start of the operation of the data strobe signal DQS is required to be empty. The memory controller MC waits for the specified latency period $t_{ADL}$ from the timing t0 when the last 1 byte of the address value ADD0 is transferred, and at the timing t1 when the waiting is completed, the data strobe signal DQS is changed to L level (S106). Then, the memory controller MC transfers the write data as the data signal DQ[7:0] and toggles the data strobe signal DQS (S107).

In the bridge chip BC, when the reception of the write data starts, the controller 103 starts measuring the amount (or size) of the received write data by using the counter 115 (S108). The method for measuring the amount of the received write data can be changed freely. For example, the controller 103 may measure the amount of the data received as the data signal DQ[7:0]. Alternatively, the controller 103 may count the number of times of toggling of the data strobe signal DQS supplied from the memory controller MC and may treat the number of times of toggling of the data strobe signal DQS as a measurement value of the amount of the received data.

In the bridge chip BC, the transfer circuit 112 waits for the prescribed latency period $t_{ALD}$ from the timing t2 when the last 1 byte of the address value ADD0 is transferred and transitions the data strobe signal DQS to the L level at the timing t3 when the waiting is completed (S109). Then, the bridge chip BC transfers the write data as the data signal DQ[7:0] and toggles the data strobe signal DQS (S110).

The memory chip CP1 stores the data received from the bridge chip BC in the data cache 203.

In the bridge chip BC, when the memory controller MC completes the transfer of the write data, the controller 103 determines that the reception of the write data is completed based on the size information 120 stored in the register 113 and the value of the counter 115. (S111). Then, the transfer circuit 112 performs a post-process (S112). That is, the transfer circuit 112 pushes out (that is, transfers) the write data remaining in the transfer circuit 112 to the memory chip CP1 by using the clock signal oscillated by the oscillator 116 as a drive signal instead of the data strobe signal DQS supplied from the memory controller MC (S112).

When the transfer of the write data is completed, the memory controller MC transfers the command C1 instructing the start of the program operation to the bridge chip BC (S113). In the bridge chip BC, the transfer circuit 112 transfers the command C1 received from the memory controller MC to the memory chip CP1 (S114).

The memory chip CP starts the program operation with respect to the command C1.

Figure 4:
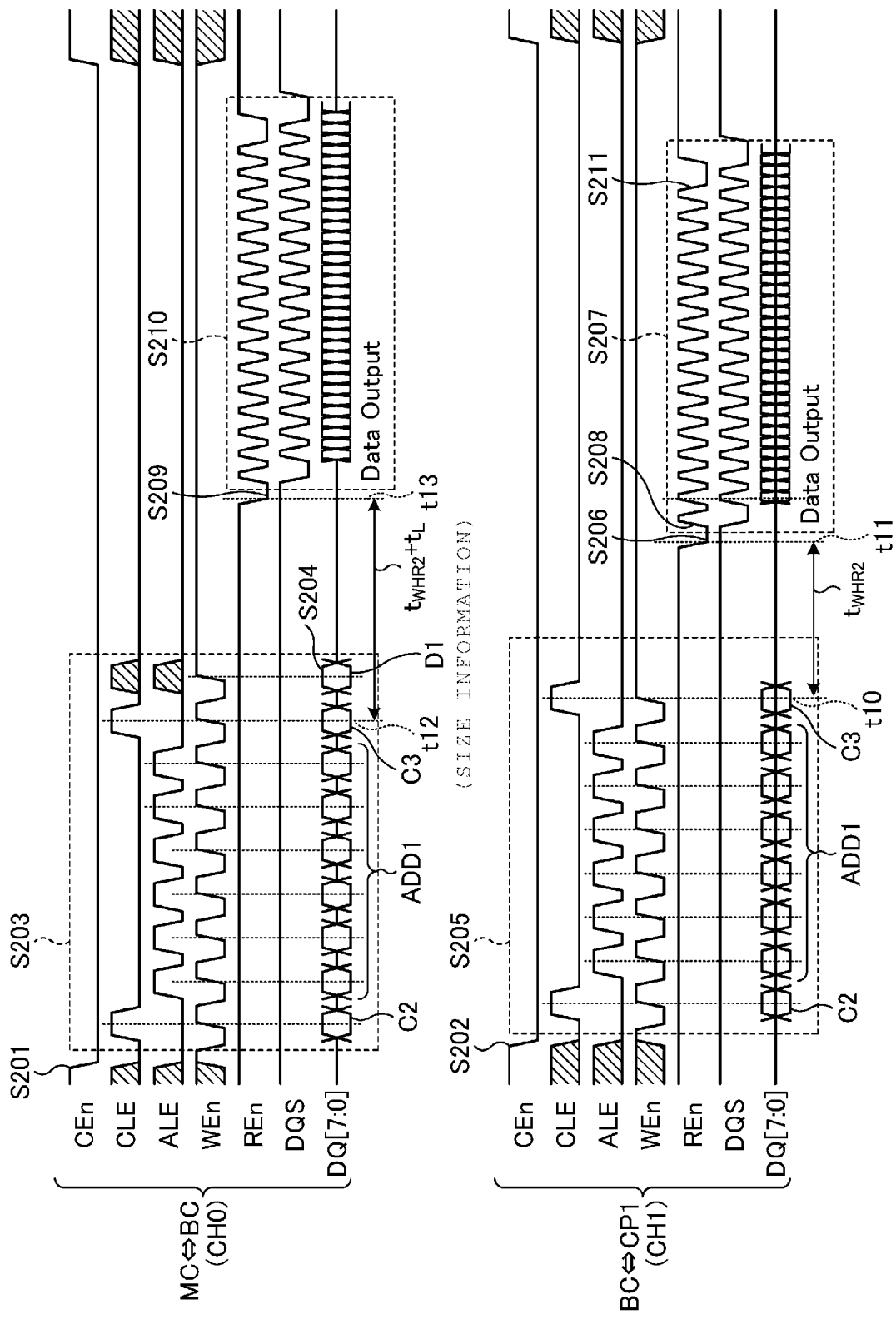
FIG. 4 is a timing chart illustrating an example of waveforms of signals transferred during a data-out operation in the memory system according to the embodiment.

FIG. 4 is a timing chart illustrating an example of waveforms of signals transferred during a data-out operation in the memory system SYS according to the present embodiment. Herein, as an example, a case where a certain memory chip CP1 connected to the channel CH1 is set as the target of the data-out operation will be described. In FIG. 4, waveforms of the chip enable signal CEn, the command latch enable signal CLE, the address latch enable signal ALE, the write enable signal WEn, the read enable signal REn among read enable signal RE/REn, the data strobe signal DQS among the data strobe signal DQS/DQSn, and the data signal DQ[7:0] in the channel CH0 and the channel CH1 are shown, and the waveforms of other signals are omitted.

First, the memory controller MC transitions the chip enable signal CEn of the channel CH0 to the active state (L level) (S201). Accordingly, the chip enable signal CEn of the channel CH1 also transitions to the active state (L level) (S202).

After that, the memory controller MC transfers the command sequence for the data-out operation including the size information to the bridge chip BC (S203). Specifically, the memory controller MC transfers a command C2 instructing the data-out operation, an address value ADD1 representing the position of the access destination, a command C3 instructing the start of preparation for the data-out operation, and a data D1 as size information in this order as the data signal DQ[7:0]. During the transferring of the commands C2 and C3, the memory controller MC maintains the command latch enable signal CLE in an active state (H level) and toggles the write enable signal WEn. During the transferring of the address value ADD1, the memory controller MC maintains the address latch enable signal ALE in an active state (H level) and toggles the write enable signal WEn. During the transferring of the data D1, the memory controller MC toggles the write enable signal WEn. It is noted that, during the transferring of the data D1, the states of the command latch enable signal CLE and the address latch enable signal ALE are freely set.

In the bridge chip BC, when receiving the size information from the memory controller MC, the command decoder 111 stores the received size information in the register 113 (S204).

In the bridge chip BC, the transfer circuit 112 transfers the command sequence for the data-out operation received from the memory controller MC to the memory chip CP1 (S205). It is noted that the mask circuit 114 masks the size information contained in the command sequence received from the memory controller MC. Therefore, the command sequence containing no size information is transferred from the bridge chip BC to the memory chip CP1.

In the toggle DDR standard, during the data-out operation, the time of the specified latency period $t_{WHR2}$ or more from the transfer of the command C3 to the start of the operation of the read enable signal REn is required to be empty. The controller 103 of the bridge chip BC waits for the specified latency period $t_{WHR2}$ from the timing t10 when the command C3 is transferred. At the timing t11 when the waiting is completed, the controller 103, autonomously transitions the read enable signal REn to the memory chip CP1 to L level (S206). Then, the controller 103 acquires the read data from the memory chip CP1 by toggling the read enable signal REn to the memory chip CP1 (S207).

When the read enable signal REn supplied from the bridge chip BC starts being toggled, the memory chip CP1 starts outputting of the read data stored in the data cache 203 in advance by the sense operation. The memory chip CP1 outputs the read data as the data signal DQ[7:0] and outputs the data strobe signal DQS based on the read enable signal REn supplied from the bridge chip BC to the bridge chip BC. The controller 103 of the bridge chip BC takes in the read data output from the memory chip CP1 as the data signal DQ[7:0] based on the data strobe signal DQS output from the memory chip CP1 and stores the taken-in read data in the buffer memory 104.

In addition, in the bridge chip BC, when the read enable signal REn to the memory chip CP1 starts being toggled, the controller 103 starts counting the number of times of toggling of the read enable signal REn by using the counter 115 (S208).

The memory controller MC waits for a period obtained by adding a delay time $t_L$ to the specified latency period $t_{WHR2}$ from the timing t12 when the command C3 is transferred. The delay time $t_L$ may be set to any value so long as the time required for preparation until the bridge chip BC outputs the read data output from the memory chip CP1 is set aside. Then, the memory controller MC transitions the read enable signal REn to the bridge chip BC to the L level at the timing t13 when the waiting is completed (S209). Then, the memory controller MC acquires the read data from the bridge chip BC by toggling the read enable signal REn to the bridge chip BC (S210).

In the bridge chip BC, when the read enable signal REn supplied from the memory controller MC starts being toggled, the controller 103 starts outputting of the read data stored in the buffer memory 104. The controller 103 outputs the read data as the data signal DQ[7:0] and outputs the data strobe signal DQS based on the read enable signal REn supplied from the memory controller MC to the memory controller MC. The memory controller MC takes in the read data output from the bridge chip BC as the data signal DQ[7:0] based on the data strobe signal DQS output from the bridge chip BC.

In the bridge chip BC, the controller 103 determines, based on the value of the counter 115 and the size information 120, whether the number of times of toggling of the read enable signal REn to the memory chip CP1 has reached the number of times corresponding to the size of the read data. When the number of times of toggling of the read enable signal REn to the memory chip CP1 reaches the number of times corresponding to the size of the read data, the controller 103 stops toggling the read enable signal REn to the memory chip CP1 (S211). Accordingly, the controller 103 can stop toggling the read enable signal REn to the memory chip CP1 before the toggling of the read enable signal REn supplied from the memory controller MC is stopped. That is, the controller 103 can determine the timing of end of the transfer of the read data before the toggling of the read enable signal REn supplied from the memory controller MC is stopped.

It is noted that the bridge chip BC can process the command sequence received from the memory controller MC even when the command sequence does not contain the size information.

For example, when the bridge chip BC receives the command sequence containing the size information from the memory controller MC, the size information is stored in the register 113. After that, when the bridge chip BC receives a new command sequence not containing the size information from the memory controller MC, during the transferring of the new command sequence, the bridge chip BC applies the size information 120 previously obtained and stored in the register 113. In this manner, the bridge chip BC may be configured so that, once the bridge chip BC stores the size information contained in the command sequence in the register 113, until the size information contained in another command sequence is acquired, the size information 120 stored in the register 113 is used.

Alternatively, when receiving the command sequence not containing size information from the memory controller MC, the bridge chip BC may be configured to operate by regarding the maximum amount (for example, the page size) defined by the standard as the size of the data of the transfer target.

In the present embodiment, the bridge chip BC can operate in any one of the first mode and the second mode. The first mode is a mode where the bridge chip BC uses the size information previously obtained from the command sequence. The second mode is a mode where, when receiving a command sequence not containing size information, the bridge chip BC operates by regarding the maximum amount (for example, the page size) defined by the standard as the size of the data of the transfer target.

Figure 5:
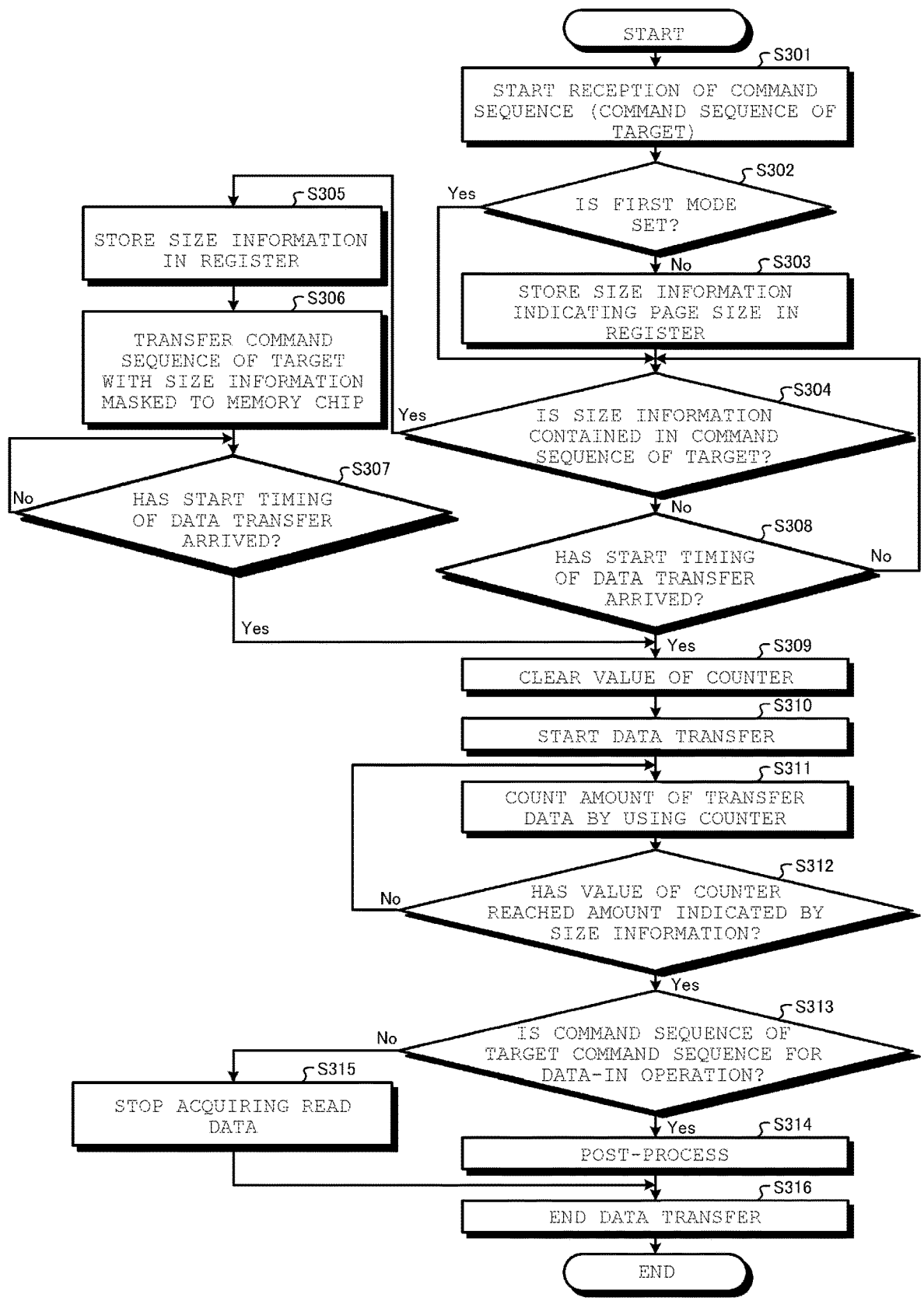
FIG. 5 is a flow chart illustrating an example of an operation when a bridge chip according to the embodiment receives a command sequence for data transfer.

FIG. 5 is a flowchart illustrating an example of the operation when the bridge chip BC according to the present embodiment receives the command sequence for the data transfer. It is noted that the size information 120 of the maximum value (for example, page size) is stored in the register 113 in a certain state (for example, a state of immediately after startup).

When the reception of the command sequence for the data transfer transmitted from the memory controller MC starts (S301), the controller 103 of the bridge chip BC determines whether or not the first mode is set as the own operation mode (S302). It is noted that the command sequence of which reception has started is referred to as a command sequence of the target in the description of FIG. 5.

When the first mode is not set as the own operation mode (S302: No), in other words, when the second mode is set as the own operation mode, the controller 103 stores size information indicating the page size in the register 113 (S303). Accordingly, even when the size information 120 is already stored in the register 113, the value of the size information 120 is overwritten with the value indicating the page size.

When the first mode is set as the own operation mode (S302: Yes), or after S303, the controller 103 determines whether or not size information is contained in the command sequence of the target (S304).

When the command sequence of the target contains size information (S304: Yes), the controller 103 stores this size information as the size information 120 in the register 113 (S305). Accordingly, even when the size information 120 is already stored in the register 113, the value of the size information 120 is overwritten with the value of the size information contained in the command sequence of the target.

The controller 103 transfers the command sequence of the target with the size information masked to the memory chip CP (S306).

Then, the controller 103 determines whether or not the start timing of the data transfer has arrived (S307).

For example, when the command sequence of the target is the command sequence for the data-in operation, the timing when the specified latency period $t_{ADL}$ or more has elapsed from the timing when the last 1 byte of the address value ADD0 is transferred is set as the start timing of the data transfer. When the command sequence of the target is the command sequence for the data-out operation, the time of the specified latency period $t_{WHR2}$ or more after transferring of the command C3 is required to be empty. Therefore, the timing at which the specified latency period $t_{WHR2}$ or more has elapsed from the timing t10 at which the command C3 was transferred is set as the start timing of the data transfer.

When the start timing of the data transfer has not arrived (S307: No), the controller 103 executes the determination process of S307 again.

When the size information is not provided in the command sequence of the target (S304: No), the controller 103 determines whether or not the start timing of the data transfer has arrived (S308), as in the process of S307. When the start timing of the data transfer has not arrived (S308: No), the controller 103 executes the determination process of S304 again.

When the start timing of the data transfer has arrived (S307: Yes or S308: Yes), the controller 103 clears the value of the counter 115 (S309) and starts the data transfer (S310).

The controller 103 measures the amount (or size) of the transfer data by using the counter 115 (S311). For example, in the case of the data-in operation, the controller 103 measures the amount of the data received as the data signal DQ[7:0] from the memory controller MC. The controller 103 may measure the number of times of toggling of the data strobe signal DQS supplied from the memory controller MC, instead of the amount of the data received as the data signal DQ[7:0] from the memory controller MC, as the amount of transferred data. In the case of the data-out operation, the controller 103 measures the number of times of toggling of the read enable signal REn to the memory chip CP.

Then, the controller 103 determines whether or not the value of the counter 115 has reached the value corresponding to the size information 120 (S312). When the value of the counter 115 has not reached the value corresponding to the size information 120 (S312: No), the controller 103 executes the process of S311 again.

When the value of the counter 115 reaches the value corresponding to the size information 120 (S312: Yes) and when the command sequence of the target is the command sequence for the data-in operation (S313: Yes), the controller 103 executes the post-process (S314). When the command sequence of the target is the command sequence for the data-out operation (S313: No), the controller 103 stops toggling of the read enable signal REn to the memory chip CP, so that the acquisition of the read data is stopped (S315). After S314 or S315, the data transfer ends (S316), and the controller 103 ends the process related to the command sequence of the target.

In the above description, the size information contained in the command sequence was transferred as the data signal DQ[7:0]. When the size information is transferred as the data signal DQ[7:0], the states of other signals may be freely set by a designer.

For example, as illustrated in FIG. 6, when the size information is transferred as the data signal DQ[7:0] (D2 in FIG. 6), the command latch enable signal CLE and the address latch enable signal ALE may be set to be in the "Don't care" state. This example is the same as the states illustrated in FIGS. 3 and 4.

Alternatively, as illustrated in FIG. 7, when the size information is transferred as the data signal DQ[7:0] (D3 in FIG. 7), both the command latch enable signal CLE and the address latch enable signal ALE may be maintained in an inactive state (L level).

Alternatively, as illustrated in FIG. 8, when the size information is transferred as the data signal DQ[7:0] (D4 in FIG. 8), both the command latch enable signal CLE and the address latch enable signal ALE are maintained in an inactive state (L level), the write enable signal WEn may not be toggled, and the data strobe signal DQS may be toggled.

As described above, according to the present embodiment, when receiving the command sequence containing the size information from the memory controller MC, the bridge chip BC starts controlling of the data transfer between the memory controller MC and the memory chip CP with respect to the command sequence. Then, the bridge chip BC ends the controlling of the data transfer at a timing in accordance with the size information.

Therefore, the efficiency of the data transfer is improved.

In addition, according to the above embodiment, when the bridge chip BC receives the write data from the memory controller MC and performs the data-in operation on the write data, the amount (or size) of the write data received from the memory controller MC is measured. The bridge chip BC performs the post-process when the measured amount reaches the amount corresponding to the size information 120.

Therefore, the bridge chip BC can start a post-process without waiting for a change in the signal operated by the memory controller MC (for example, the chip enable signal CEn or the command latch enable signal CLE) after the reception of the write data is completed. That is, the total time required for the data-in operation is shortened, and the efficiency of the data-in operation is improved.

In addition, according to the above embodiment, the bridge chip BC instructs the memory chip CP to output the read data by toggling the read enable signal REn to the memory chip CP, acquires the read data from the memory chip CP, and transfers the read data to the memory controller MC. At this time, the bridge chip BC measures the number of times of toggling of the read enable signal REn to the memory chip CP. When the measured number of times of toggling reaches the number of times corresponding to the size information 120, the bridge chip BC stops toggling of the read enable signal REn to the memory chip CP.

Therefore, the bridge chip BC can acquire only the read data instructed by the memory controller MC from the memory chip CP. In other words, the total time spent for the data-out operation can be reduced, and thus, the efficiency of the data-out operation is improved.

In addition, according to the above embodiment, the bridge chip BC includes the register 113. When receiving the command sequence containing the size information, the bridge chip BC stores the size information as the size information 120 in the register 113. When receiving the command sequence not containing size information, the bridge chip BC ends the controlling of the data transfer at a timing in accordance with the size information 120 acquired from the previous command sequence and stored in the register 113.

Therefore, the frequency of the memory controller MC transferring the size information to the bridge chip BC can be reduced.

In addition, according to the above embodiment, the bridge chip BC is configured to be able to receive the size information during the specified latency period provided between the start timing of the transfer of the command sequence and the start timing of the data transfer.

Therefore, deterioration in efficiency of the data transfer due to the transfer of the size information is prevented.

In addition, according to the above embodiment, when the bridge chip BC receives the command sequence containing the size information, the size information is masked, and the command sequence is transferred to the memory chip CP.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor storage device comprising:
   a plurality of semiconductor memory chips; and
   a bridge chip including:
   a first interface connectable to an external memory controller that is external to the semiconductor storage device;
   a plurality of second interfaces connected to the semiconductor memory chips; and
   a controller configured to:
   upon receiving, by the first interface, a first command sequence that includes a data transfer command to perform data writing into one of the semiconductor memory chips and size information indicating a size of data to be written, start an operation to perform the data writing;

toggle a signal transmitted via a data strobe signal line of the first interface, and determine that an amount of data that has been received by the first interface during the data writing has reached the size indicated by the size information based on a toggle count of the signal; and end the operation, upon the amount of data that has been received by the first interface during the data writing reaching the size indicated by the size information.

2. The semiconductor storage device according to claim 1, wherein the controller is configured to stop toggling the signal upon determining that the amount of data has reached the size indicated by the size information.

3. The semiconductor storage device according to claim 2, wherein the controller includes an oscillator configured to generate an oscillation signal, and the controller is configured to transmit a fraction of data that has been received by the first interface but has not been transmitted to the one of the semiconductor memory chips in synchronization with the oscillation signal, after the toggling of the signal is stopped.

4. The semiconductor storage device according to claim 1, wherein the controller is configured to:

upon receiving, by the first interface, a second command sequence that includes a second data transfer command to perform data reading from one of the semiconductor memory chips and second size information indicating a size of data to be read, start a second operation to perform the data reading;

toggle a second signal transmitted via a data strobe signal line of one of the second interfaces connected to the one of the semiconductor memory chips with respect to which the data reading is performed, and determine that an amount of data that has been received by the first interface during the data reading has reached the size indicated by the second size information based on a toggle count of the second signal; and end the second operation, upon the amount of data that has been received by the first interface during the data reading reaching the size indicated by the second size information.

5. The semiconductor storage device according to claim 4, wherein the controller is configured to stop toggling the second signal upon determining that the amount of data that has been received by the first interface during the data reading has reached the size indicated by the second size information.

6. The semiconductor storage device according to claim 1, wherein the first command sequence includes the data transfer command, address information, and the size information, in this order, the controller is configured to start the operation a predetermined period of time after the address information has been received, and the size information is received during the predetermined period of time.

7. The semiconductor storage device according to claim 1, wherein the controller is configured to transfer the first command sequence received by the first interface to one of the second interfaces, after excluding the size information from the received first command sequence.

8. The semiconductor storage device according to claim 1, wherein the controller is configured to:

upon receiving by the first interface after the first command sequence, a third command sequence that includes a third data transfer command to perform data transfer with one of the semiconductor memory chips and no size information indicating a size of data to be transferred, start a third operation to perform the data transfer; and end the third operation, upon an amount of data that has been received by the first interface during the data transfer reaching the size indicated by the size information included in the first command sequence.

9. The semiconductor storage device according to claim 1, wherein the controller is configured to operate in a first mode and a second mode, in the first mode, the controller, upon receiving by the first interface after the first command sequence, a third command sequence that includes a third data transfer command to perform data transfer with one of the semiconductor memory chips and no size information indicating a size of data to be transferred, starts a third operation to perform the data transfer, and ends the third operation, upon an amount of data that has been received by the first interface during the data transfer reaching the size indicated by the size information included in the first command sequence, and in the second mode, the controller, upon receiving by the first interface the second third command sequence after the first command sequence, starts the third operation to perform the data transfer, and ends the third operation, upon an amount of data that has been received by the first interface during the data transfer reaching a predetermined maximum size of data that can be transferred per command sequence.

10. A memory system comprising:

a memory controller chip; and a semiconductor storage device including:

a plurality of semiconductor memory chips; and a bridge chip including:

a first interface connected to the memory controller chip;

a plurality of second interfaces connected to the semiconductor memory chips; and a controller configured to:

upon receiving, by the first interface, a first command sequence that includes a data transfer command to perform data writing into one of the semiconductor memory chips and size information indicating a size of data to be written, start an operation to perform the data writing;

toggle a signal transmitted via a data strobe signal line of the first interface, and determine that an amount of data that has been received by the first interface during the data writing has reached the size indicated by the size information based on a toggle count of the signal; and end the operation, upon the amount of data that has been received by the first interface during the data writing reaching the size indicated by the size information.

11. The memory system according to claim 10, wherein the controller of the bridge chip is configured to:

upon receiving, by the first interface, a second command sequence that includes a second data transfer command to perform data reading from one of the semiconductor memory chips and second size information indicating a size of data to be read, start a second operation to perform the data reading;

toggle a second signal transmitted via a data strobe signal line of one of the second interfaces connected to the one of the semiconductor memory chips with respect to which the data reading is performed, and determine that an amount of data that has been received by the first interface during the data reading has reached the size indicated by the second size information based on a toggle count of the second signal; and end the second operation, upon the amount of data that has been received by the first interface during the data reading reaching the size indicated by the second size information.

12. A method for controlling a semiconductor storage device including a plurality of semiconductor memory chips and a bridge chip that includes a first interface connectable to an external memory controller that is external to the semiconductor storage device and a plurality of second interfaces connected to the semiconductor memory chips, the method comprising:

upon receiving, by the first interface, a first command sequence that includes a data transfer command to perform data writing into one of the semiconductor memory chips and size information indicating a size of data to be written, starting an operation to perform the data writing;

toggling a signal transmitted via a data strobe signal line of the first interface;

determining that an amount of data that has been received by the first interface during the data writing has reached the size indicated by the size information based on a toggle count of the signal; and ending the operation, upon the amount of data that has been received by the first interface during the data writing reaching the size indicated by the size information.

13. The method according to claim 12, further comprising:

upon receiving, by the first interface, a second command sequence that includes a second data transfer command to perform data reading from one of the semiconductor memory chips and second size information indicating a size of data to be read, starting a second operation to perform the data reading;

toggling a second signal transmitted via a data strobe signal line of one of the second interfaces connected to the one of the semiconductor memory chips with respect to which the data reading is performed; and determining that an amount of data that has been received by the first interface during the data reading has reached the size indicated by the second size information based on a toggle count of the second signal; and ending the second operation, upon the amount of data that has been received by the first interface during the data reading reaching the size indicated by the second size information.

14. The method according to claim 13, further comprising:

stopping toggling the second signal upon determining that the amount of data that has been received by the first interface during the data reading has reached the size indicated by the second size information.

15. The method according to claim 12, further comprising:

stopping toggling the signal upon determining that the amount of data has reached the size indicated by the size information.

16. The method according to claim 15, wherein the bridge chip includes an oscillator configured to generate an oscillation signal, and the method further comprises transmitting a fraction of data that has been received by the first interface but has not been transmitted to the one of the semiconductor memory chips in synchronization with the oscillation signal, after the toggling of the signal is stopped.

17. The method according to claim 12, wherein the first command sequence includes the data transfer command, address information, and the size information, in this order, the operation is started a predetermined period of time after the address information has been received, and the size information is received during the predetermined period of time.

18. The method according to claim 12, further comprising:

transferring the first command sequence received by the first interface to one of the second interfaces, after excluding the size information from the received first command sequence.

19. The method according to claim 12, further comprising:

upon receiving by the first interface after the first command sequence, a third command sequence that includes a third data transfer command to perform data transfer with one of the semiconductor memory chips and no size information indicating a size of data to be transferred, starting a third operation to perform the data transfer; and ending the third operation, upon an amount of data that has been received by the first interface during the data transfer reaching the size indicated by the size information included in the first command sequence.

20. The method according to claim 12, further comprising:

in a first mode, upon receiving by the first interface after the first command sequence, a third command sequence that includes a third data transfer command to perform data transfer with one of the semiconductor memory chips and no size information indicating a size of data to be transferred, starting a third operation to perform the data transfer, and ending the third operation, upon an amount of data that has been received by the first interface during the data transfer reaching the size indicated by the size information included in the first command sequence, and in a second mode, upon receiving by the first interface the third command sequence after the first command sequence, starting the third operation to perform the data transfer, and ending the third operation, upon an amount of data that has been received by the first interface during the data transfer reaching a predetermined maximum size of data that can be transferred per command sequence.

* * * * *

UNITED STATES PATENT AND TRADEMARK OFFICE
CERTIFICATE OF CORRECTION

| | | |
|---|---|---|
| PATENT NO. | : 12,182,411 B2 | Page 1 of 1 |
| APPLICATION NO. | : 18/176364 | |
| DATED | : December 31, 2024 | |
| INVENTOR(S) | : Goichi Ootomo | |

It is certified that error appears in the above-identified patent and that said Letters Patent is hereby corrected as shown below:

In the Claims

In Column 16, Claim 9, Line 30, delete "second" after "the".

Signed and Sealed this
Twenty-seventh Day of May, 2025

Coke Morgan Stewart
*Acting Director of the United States Patent and Trademark Office*